Sept. 8, 1936.	D. D. KNOWLES	2,053,436
IMPACT METER
Filed Sept. 6, 1930
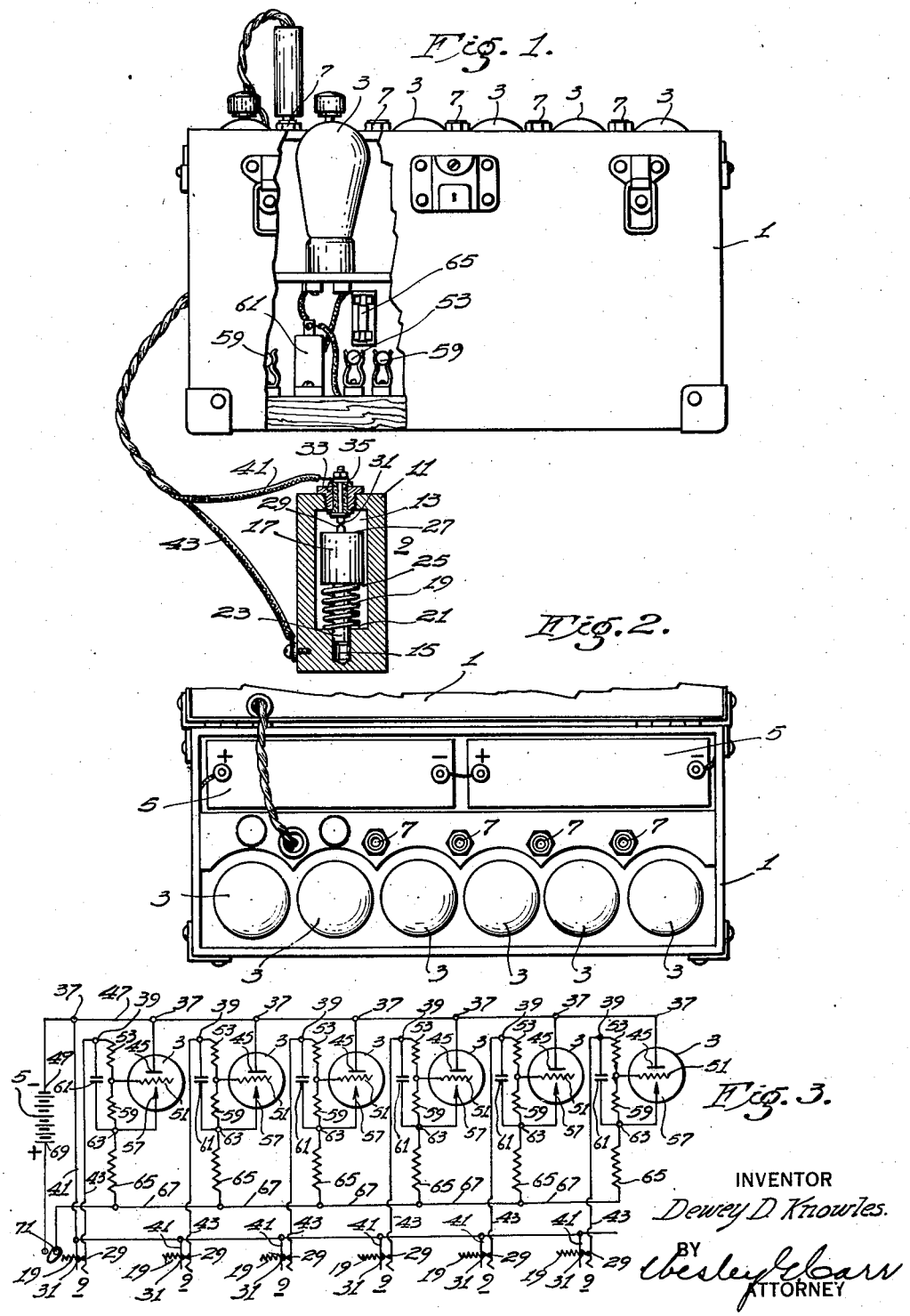

Patented Sept. 8, 1936

2,053,436

UNITED STATES PATENT OFFICE 2,053,436

IMPACT METER

Dewey D. Knowles, Wilkinsburg, Pa., assignor to Westinghouse Electric & Manufacturing Company, a corporation of Pennsylvania Application September 6, 1930, Serial No. 480,147

3 Claims. (Cl. 177—311)

My invention relates to electric discharge devices and has particular relation to systems utilized in measuring the intensity of impact forces.

The present invention is a continuation-in-part of my copending application, Serial No. 149,290, filed November 19, 1926.

It is an object of my invention to provide apparatus for measuring impacts.

Another object of my invention is to provide impact-measuring apparatus wherein the presence of an impact, of predetermined magnitude, is indicated visually.

A further and more specific object of my invention is to provide apparatus for indicating, at a central station, the magnitude of vibration existing at a plurality of predetermined regions of a system.

A still further specific object of my invention is to provide apparatus for indicating the magnitude of vibration existing in a predetermined region of a system, such as a vehicle, at varied orientations of the system.

An additional specific object of my invention is to provide apparatus for indicating the magnitude of vibration existing in a predetermined region of a system at predetermined time periods.

Still another object of my invention is to provide a portable impact meter.

An ancillary object of my invention is to provide apparatus for detecting the existence of a fluid pressure of predetermined magnitude.

Another ancillary object of my invention is to provide apparatus for detecting continuous and persisting forces of predetermined magnitude.

A further ancillary object of my invention is to provide, in apparatus of the type wherein a grid-controlled electric discharge tube is utilized, a device for interrupting the discharge in the tube after it has been initiated.

More concisely stated, it is an object of my invention to provide tractable and portable apparatus for measuring and visually indicating the magnitude of impacts and hence, the extent of vibration of rigid systems.

According to my invention, I provide a mechanical impact-responsive device comprising a mass resiliently supported and capable of moving under its support under the action of an impact force. The mass, under normal circumstances, closes a contact connecting the control electrode of an electric discharge tube to the cathode of the tube. However, when it moves under the action of an impact, the circuit is opened and the tube is brought to a state of excitation, thus indicating the presence of an impact sufficient to move the particular mass under the action of the particular spring.

The impact which is capable of moving a given mass, is a function of the magnitude of the mass and of the properties of spring supporting it. Hence, by providing a plurality of masses supported on a plurality of springs, the masses and the springs having a variety of properties, impacts of various magnitudes may be measured. In this manner an impact measuring scale may be provided.

One of the features that is particularly requisite for an impact meter, of the type described herein, is portability. It must moreover, be capable of being operated from a direct-current supply source for, under ordinary circumstances, alternating current is not available on the systems to which the meter is applied.

Moreover, it is a well known fact that a grid-controlled electric discharge tube, when once excited, tends to lock itself in and to continue in the state of excitation. Accordingly, I have provided a circuit whereby the tube associated with a certain impact contactor reverts to an unexcited state when the contact is closed; that is, when the impact force has ceased to act on the mass.

The novel features that I consider characteristic of my invention are set forth with particularity in the appended claims. The invention itself, however, both as to its organization and its method of operation, together with additional objects and advantages thereof, will best be understood from the following description of a specific embodiment, when read in connection with the accompanying drawing, in which:

Figure 1 is a view in side elevation, with the cover opened and part of the side broken away, showing a preferred embodiment of my invention, Fig. 2 is a plan view of the embodiment of my invention, and Fig. 3 is a schematic view illustrating the electrical circuit utilized in practicing my invention.

The apparatus shown in the drawing comprises a carrying case 1 wherein are disposed a plurality of electric discharge tubes 3, (that for the preferred practice of my invention, should be grid-controlled glow tubes), a battery of dry cells 5 for operating the tubes 3, and a plurality of control elements, the characteristics and function of which will be specified hereinafter.

The carrying case 1 is provided with a plurality of female plugs 7 through which which the electric discharge systems are connected to mechanical impact-responsive devices 9, as shall be explained presently. A single impacter is indicated in Fig. 1, but it should be regarded as symbolical of the others that are in the ordinary applications of my invention connected in the remaining plugs 7.

The mechanical impacter 9 is illustrated in Fig. 1 and comprises a container 11, in which a cylindrical opening 13, provided with an attenuated section 15, is milled. A cylindrical mass 17 is mounted within the opening 13 on a spring 19 of predetermined characteristics, supported on the shoulder 21 formed between the openings 13 and 15. The cylinder 17 is provided with a stem 23 that projects from its lower base 25 and engages the constricted portion 15 of the opening. It is thus prevented from tilting as it moves in the distended portion 13 of the opening.

Projecting from the upper base 27 of the cylindrical mass 17 is a stub 29 that is adapted to make contact with a second stub 31 supported in a shell 33 of longitudinal T-section, secured in the top of the container 11. The second stub 31 is insulated from the shell 33 of T-section by a dielectric cylinder 35 and is connected to one terminal 37 of the grid-glow tube circuit. The container 11 is connected to another terminal 39 of the grid-glow tube circuit, and the circuit between the two leads 41 and 43 making the connection is closed as long as the cylindrical mass 17 is in its uppermost position.

The contactor 9 is disposed on the object that is under investigation. When the object vibrates under the force of an impact the outer cylinder 11 moves with it and the mass 17 floating on the spring 19 moves with it under the action of the stub 31. When the outer cylinder 11 returns to its original position the spring 19 is compressed and the contact is broken for an instant.

If the relative position of the spring and contacts are interchanged it is apparent that the contact is opened in the initial motion of the cylinder 11. There is considerable application for both types of contactors and they should be included within the scope of my invention.

It is furthermore important to note that while apparatus has been described herein which operates in the opening of a contactor, apparatus that operates on the closing of a contactor is equally as well operable and may be found useful in certain connections. The application of the contactor that is normally open to my invention is apparent and should be included within its scope.

As has been intimated above, the mechanical impact indicator 9, represented in the drawing should only be regarded as symbolical of a series of devices of the same character, each device having such properties as to respond to an impact of, at least, a predetermined magnitude. These impacters 9 may be disposed, for example, at different points in a system, such as a vehicle, and thus provide an indication of the extent of vibration existing at the particular points in the system. The impacters may also be disposed in a single region in a system and thus are adapted to yield an impact-time curve or an impact-position curve for the system.

It is furthermore to be noted that, although my system has been illustrated above as utilizing grid-controlled glow tubes, it is equally as well adaptable to be utilized with other types of electric discharge tubes, such as grid-controlled mercury-arc tubes or thermionic tubes.

It is to be noted, however, that grid-controlled glow tubes are abrupt in their action, and consequently, are more suited for a system of the type described hereinabove than ordinary thermionic tubes.

The electrical circuit for the apparatus is illustrated in Fig. 3. In this view, the complete series of impacters 9 are illustrated.

The cathodes 45 of the grid-glow tubes 3 are connected to a common bus line 47 that is, in turn, connected to the negative terminal 49 of the power source 5, the preferred form of which is a battery of dry cells, as illustrated. One element 31 of each of the contactors, described and illustrated above, are also connected to the bus line, and hence, to the cathodes 45 of the tubes 3. The remaining element 29 of the contactors are each connected to the control electrode 51 of the tubes 3 through a resistor 53. The control electrode 51 of each tube 3 is connected to the anode 57 through a second resistor 59 and a capacity 61 of predetermined magnitude, is connected across the two resistors 53 and 59 in each case. The common junction 63 of the leads from the anode 57, the capacity 61, and the resistor 59, is connected, through a resistor 65 to a bus line 67, which is, in turn, connected to the positive terminal 69 of the power source 5.

Under ordinary circumstances, the springs 19 in the impacters resiliently urge the corresponding masses 17 to close the contacts 29 and 31 and the corresponding tubes 3 are in an unexcited state. However, under the force of an impulse, certain of the contacts 29 and 31 are opened and the corresponding tubes 3 break down, indicating that the impulse is of a certain magnitude.

When the contacts 29 and 31 are closed, the corresponding capacities 61 are charged and the opening of the contacts causes them to discharge through the tubes. However, when the contacts are again closed, each uncharged capacity 61 connected across the tube 3 acts as a short circuit for the particular tube and causes it to revert to an unexcited state.

To prevent the battery 5 from being drained when the apparatus is not in use I have included a switch 71 in the battery circuit that is closed when the apparatus is put into use. The switch may of course be positioned in such a manner that it is closed when the door of the chamber 1 is opened or when a male plug is inserted in the female plug 7.

In one type of equipment that I have found useful, tubes 3 of the type requiring an electromotive force 5 of 430 volts are utilized. The resistors 53 and 59 that are connected between the control electrodes 51, and the principal electrodes 45 and 57 of each tube are each of the order of 25000 ohms. The limiting resistors 65 are of the order of .5 megohm and the capacities 61 are of the order of .25 micro-farad.

As described and illustrated hereinabove, my invention has been specifically applied to the detection and measurement of discontinuous or impulsive forces. It may also be applied to the measurement of continuous forces.

In the present connection, I have found that my invention may be applied to Diesel engines wherein an indication that the pressure has attained a minimum value is of extreme importance.

Another important application of my invention of the same general nature arises in acoustic measuring systems. I have found that my device may be made of such sensitivity as to respond to sound pressure. It is thus possible to utilize apparatus constructed according to my invention to measure the reverberation constant of an auditorium.

In the last-mentioned application, the impacters are disposed in a room in the region where it is desirable that the reverberation constant be known, and the response of the tubes to the sound pressure is observed and timed.

It is needless to say that with the vast amount of acoustic work that is at present being done on motion picture houses the value of my invention in this respect is inestimable.

In the following claims the expression "electric discharge tube of arc-like discharge type" is used. By this expression I mean a tube having an abrupt characteristic. Such a tube may be regarded as having two conditions of excitation, a deenergized condition and an energized condition. As the potentials impressed on its electrodes are varied, the tube passes abruptly from one condition to the other. If a tube of this type is provided with a control electrode, it may be energized by varying the control potential, but if it is once energized, it cannot be deenergized by reverting the control potential to a value at which the tube would be deenergized were it not initially energized. It will be noted that the definition applies to the discharge tubes 3.

Although I have shown and described a certain specific embodiment of my invention, I am fully aware that many modifications thereof are possible. My invention, therefore, is not to be restricted except insofar as is necessitated by the prior art and by the spirit of the appended claims.

I claim as my invention:

1. An indicator of the type including a flexibly supported mass associated with a gaseous electric discharge tube of the arc-like discharge type having principal electrodes and a control electrode, means for impressing an initial control potential on said control electrode such that said tube is maintained in a predetermined condition of excitation, means, responsive to the movement of said mass, to vary said initial potential by a predetermined amount such that the condition of excitation of said tube is changed, and means, responsive to a subsequent movement of said mass such that the potential of said control electrode is varied in a sense opposite to the sense of the last said variation and by at least a predetermined amount to revert the excitation of said tube to its initial condition.

2. In an indicator of the type including a flexibly supported mass associated with a pair of separable contacts, a gaseous electric discharge tube of the arc-like discharge type having principal electrodes and a control electrode, one member of said pair being connected to the control electrode of said tube and to one terminal of a capacitor, the other member of the pair being connected to one principal electrode of said tube and the other principal electrode of the tube being connected to the other terminal of said capacitor.

3. An indicator of the type including a flexibly supported mass associated with a gaseous electric discharge tube of the arc-like discharge type having principal electrodes and a control electrode and adapted to emit a visual glow, means for rendering the potential of said control electrode responsive to the movement of said means, the last-said means comprising connections for impressing potentials between the control electrode and the principal electrodes of the discharge device such that the discharge device is normally deenergized, and becomes energized when said mass is displaced by an impact and remains energized as long as the mass is displaced.

DEWEY D. KNOWLES.